April 30, 1968  J. S. GRIER ET AL  3,381,033
CONTINUOUS CRYSTALLIZATION OF GLUTAMIC ACID
IN ITS ALPHA ORTHORHOMBIC FORM
Filed Dec. 31, 1964
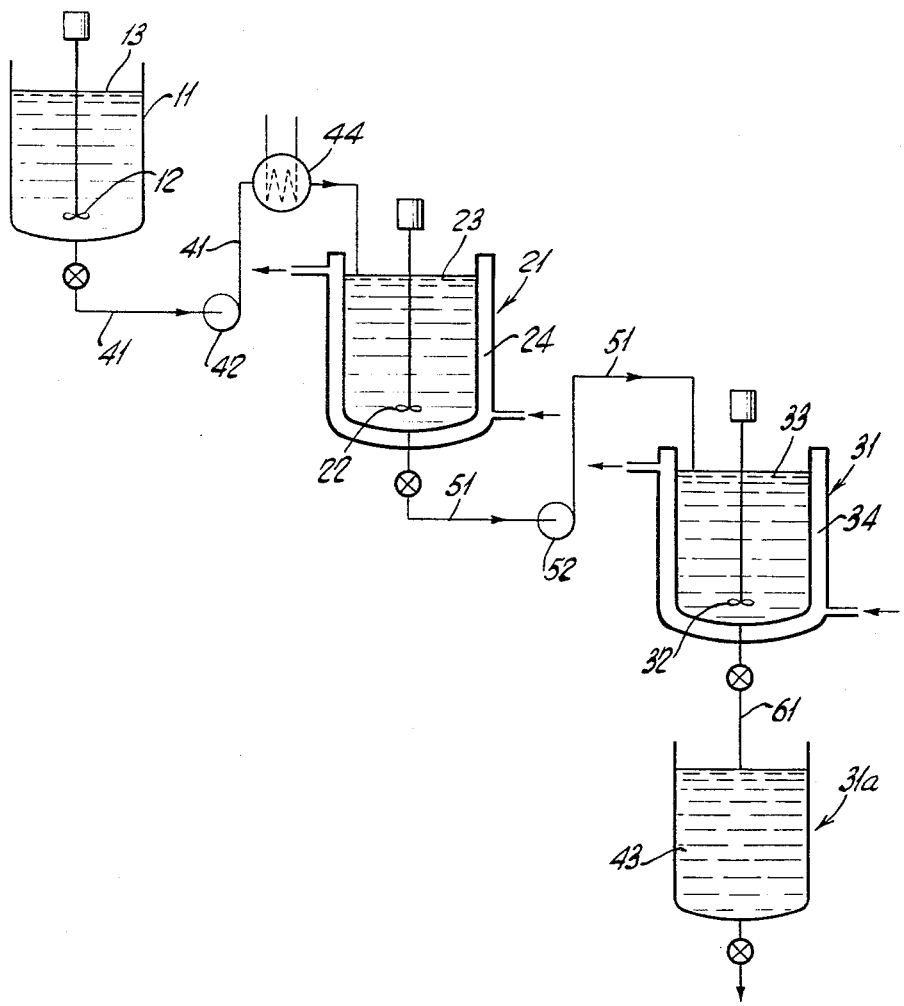
INVENTORS
JAMES S. GRIER
SEEMON H. PINES
BY
ATTORNEY

United States Patent Office 3,381,033
Patented Apr. 30, 1968

3,381,033
CONTINUOUS CRYSTALLIZATION OF GLUTAMIC ACID IN ITS ALPHA ORTHORHOMBIC FORM
James S. Grier, Danville, Pa., and Seemon H. Pines, Murray Hill, N.J., assignors to Merck & Co., Inc., Rahway, N.J., a corporation of New Jersey
Filed Dec. 31, 1964, Ser. No. 422,684
4 Claims. (Cl. 260—534)

ABSTRACT OF THE DISCLOSURE

Process for the preparation of glutamic acid in its alpha orthorhombic crystalline form by continuous crystallization using alpha orthorhombic crystalline glutamic acid as seed crystals.

---

This invention relates to a method for the crystallization of glutamic acid. More particularly, it relates to an improved process of preparing crystalline glutamic acid in the alpha orthorhombic form by continuous crystallization.

The economical production of glutamic acid is of considerable commercial importance since the monosodium salt thereof is highly useful as a flavor-enhancing agent in food production. Several methods of obtaining or producing glutamic acid have been reported in the scientific and patent literature. Most of these are with chemical methods which lead to the racemic form of glutamic acid and require a resolution step to obtain the natural form or isolation method wherein glutamic acid is recovered from various natural sources.

There are many well known methods for producing glutamic acid. One method is to produce glutamic acid from raw materials which yield it upon hydrolysis. Another method of producing glutamic acid is by direct fermentation of a nutrient medium with a suitable microorganism in either batch or continuous fermentation processes. Since the monosodium salt of glutamic acid finds wide use in the food industry, it is important to produce glutamic acid having as high a degree of purity as possible. The process of crystallization of glutamic acid of the present invention does not depend on the method in which the glutamic acid is produced. Any slurry of glutamic acid may be utilized as a starting material in the crystallization process of the present invention.

When crude glutamic acid is crystallized at its isoelectric point, that is, a pH of about 3.2, for example, by adjusting the pH of a monosodium glutamate-containing solution with hydrochloric acid, the adjusted mixture is filtered or centrifuged, and the glutamic acid cake is washed with water in order to remove water soluble impurities. Difficulty is encountered at this point, because on centrifuging, the crystalline glutamic acid ordinarily packs into a hard cake and contains considerable mother liquor. The use of relatively large amounts of water is required to reduce the salt content of the cake to an acceptable value. The crystalline cake of glutamic acid is likewise difficult to remove from the centrifuge due primarily to the inherent shape of the glutamic acid crystals formed in the previously described process. The crystals are fragile, elongated plates or needles, and are classed as belonging to the beta orthorhombic system. These crystals also have a tendency to fracture into irregular fragments, and when handled in relatively large quantities, considerable dust results which constitutes an explosion hazard as well as creating undesirable working conditions.

While the crystals are anhydrous, the grouping together of large amounts in the presence of a relatively small amount of water, such as is supplied by washing in a centrifuge load of such crystals, causes the water to be retained in the cake and causes the cake itself to pack firmly against the walls of the centrifuge so that, as previously mentioned, considerable difficulty is experienced in removing the cake. This crystalline form of glutamic acid, after drying, is not free-flowing; and due to its needlelike form, much space is wasted in storing and shipping it in any sizable quantity as compared to the product produced by the process of the present invention.

Crystalline glutamic acid is reported in the literature as belonging to the orthorhombic system, its crystalline habit varying somewhat depending upon the method of preparation. Keenan, in volume 62 of the "Journal of Biochemistry," pages 165 to 172 describes the glutamic acid crystals as orthorhombic tetrahedra. Other references report glutamic acid crystals as orthorhombic sphenoidal or rhombic bisphenoidal.

Crystallographic data for L-glutamic acid may be found in P. Grath's "Chemische Krystallographie," Tl. 3, page 407 (Leipzig, 1910); and in A. N. Winchell's "Optical Properties of Organic Compounds," page 56 (University of Wisconsin Press, Madison, 1943). L-glutamic acid crystals are described as orthorhombic sphenoidal with linear axial constants of $a:b:c=0.687:1:0.8551$, habit varied, sphenoidal, or short prismatic.

Birnal, in "Zeitschrift fur Kristallographie," volume 78, pages 363–9 (1931), reported the constants of the unit cell $a_0 = 7.06$ Angstrom units, $b_0 = 10.3$ Angstrom units, and $c_0 = 8.75$ Angstrom units.

As far as is known, the orthorhombic crystal of glutamic acid described in the aforementioned references is the stable modification obtained at about room temperature in the presence of its saturated aqueous solution, or of the mother liquor obtained in the preparation of glutamic acid from solutions containing monosodium glutamate. This orthorhombic crystal of glutamic acid is ordinarily manufactured when the amount of hydrochloric acid necessary to adjust a solution containing between about 20% and about 25% of monosodium glutamate to a pH of between about 3.0 and about 3.3 is slowly added to said solution with stirring, or it can also be prepared by first seeding a solution containing monosodium glutamate with the aforementioned crystals of glutamic acid and adjusting the pH with mineral acid to between about 3.0 and about 3.3. The latter process assures a product comprising essentially the orthorhombic type crystal referred to previously. The orthorhombic form of glutamic acid is crystallized in like manner from a solution of glutamic acid hydrochloride by the addition of caustic to obtain a pH of about 3.2.

In a continuous process in which hydrochloric acid and monosodium glutamate-containing solutions are slowly and simultaneously added to a large circulating body or slurry containing the stable orthorhombic crystal of glutamic acid, which by the continuous addition of monosodium glutamate solution and hydrochloric acid is held at a pH of between about 3.0 and about 3.3, the continued production and growth of this type of product is almost certain.

It would be desirable that a modification of this type of crystal of glutamic acid be produced in order to overcome the above described difficulties experienced in centrifuging or filtering the glutamic acid crystals from the solutions and to obtain a form of glutamic acid having more desirable physical properties. This may be accomplished if the glutamic acid is crystallized into the alpha orthorhombic form rather than the beta orthorhombic form.

The object of the present invention is to provide a process for the crystallization of glutamic acid in the alpha orthorhombic form which is granular in shape rather than the conventional beta orthorhombic or needlelike and plate-like form.

Another object of the present invention is to provide a method for the crystallization of glutamic acid in the alpha orthorhombic form by a continuous process.

An additional object of the present invention is to provide a method that allows for higher purity and ease of washing of glutamic acid.

A further object of the present invention is to provide a continuous crystallization method for the producing of alpha orthorhombic glutamic acid which will allow substantial reduction in operating costs and equipment requirements.

A still further object of the present invention is to provide a process for continuous crystallization of alpha orthorhombic glutamic acid without the necessity of the addition of auxiliary chemical agents such as acids or alkalis as is customary in the prior art in order to dissolve glutamic acid and thereafter subsequently allow crystallization.

Other additional objects of the present invention will become apparent to those skilled in the art by reading the specification and viewing the accompanying drawing referred to herein.

The present invention is based on the discovery that continuous crystallization of alpha orthorhombic glutamic acid can be accomplished without obtaining the undesirable beta orthorhombic form of glutamic acid and that this continuous process of crystallization of alpha orthorhombic glutamic acid is accomplished without the use of any additional chemical additives during the reaction such as acids and alkalis. The use of such additives in a process of crystallization of glutamic acid is the present state of the art and is utilized in order to dissolve glutamic acid before crystallization. A process of this type is described in U.S. Patent 2,683,739 which issued July 13, 1954, to Samuel H. Weidman. However, the process of the present invention is an improvement over this type of process not only because it is continuous but of even more significance is the fact that the process of the present invention is more economical with respect to equipment necessary to operate the process and the materials involved in the process itself.

In the main embodiment of the method of the present invention alpha orthorhombic glutamic acid crystals are produced continuously in a multistage process. The stages of the continuous process of the present invention comprise feed stage, one or more, preferably two crystallization stages and an isolation or washing and filtration stage.

A slurry of glutamic acid produced by any method is prepared and supplied to a feed slurry vessel where the slurry is agitated and pumped continuously through a heat exchanger to effect complete solution. The heated solution is immediately discharged into a seed bed crystallization vessel containing alpha orthorhombic seed crystals and agitated at reduced temperature producing a slurry containing alpha orthorhombic glutamic acid which is continuously removed to either a second crystallization vessel where a higher yield may be obtained or, if desired, the slurry may be immediately filtered in an isolation vessel.

The continuous crystallization process of the present invention is initiated by providing a slurry of glutamic acid which is agitated and pumped through a heat exchanger to effect complete solution of the slurry. The heated solution is transferred to a crystallization vessel in which alpha orthorhombic seed crystals of glutamic acid have been placed. The crystallization vessel is provided with a cooling jacket which maintains the liquid in the vessel at the proper temperature range for crystallization to take place. The liquid that is supplied through the heat exchanger to the first crystallization vessel is continuously removed as a slurry to another crystallization vessel, similarly equipped, for further crystallizing if higher yields are desired. However, this step is not necessary and the liquid from the first crystallizer may be supplied directly to an isolation vessel for filtering and washing if a lower yield is acceptable. If the second or more crystallization vessel is utilized, the crystal containing slurry is filtered and washed as described above.

In the process of the present invention it has been found that the concentration of the glutamic acid feed slurry pumped at a feed rate of from 10 to 50 ml. per minute with 25 being preferred through the heat exchanger is in the range of about from 20 to about 100 grams per liter with the preferred range being about 65 grams per liter, the oil bath in the heat exchanger ranges from about 80° to 150° C., 100° C. being preferable. The alpha orthorhombic seed crystal magna is usually made up of about from 50 to about 150 grams of alpha orthorhombic glutamic acid in 1000 ml. of water, preferably 80 grams per liter of water. The cooking jacket for the first crystallizer vessel maintains an internal temperature of from about 0 to 25° C. and the second from about 0 to 10° C. and transfer of slurry from one vessel to another is best accomplished in a range of about 10 to about 50 ml. per minute. The crystallization time in the crystallization vessel is usually accomplished in about 1 to about 3 hours with about 2 hours being preferable.

It is obvious that the process of the present invention which employs one or two crystallization vessels could be extended by placing other vessels in series. A single feed vessel, for instance, could supply two or more first crystallizer vessels and a single crystallization vessel could supply two or more isolation vessels, etc.

In the drawing FIGURE 1 diagrammatically illustrates the supply crystallization and isolation vessels for carrying out the processes of the present invention.

In the drawing:

FIGURE 1 is a diagrammatic view of the apparatus for carrying out the method of the present invention.

Referring now more particularly to the drawings in detail wherein similar reference characters designate corresponding parts throughout the view, there is indicated at 11 a feed supply tank into which is supplied glutamic acid slurry 13 which is agitated by agitator 12. Slurry 13 is pumped through pipe 41 by pump 42 through heat exchanger 44 and then to first crystallizer vessel 21 into which alpha orthorhombic seed crystals of glutamic acid have been placed. Vessel 21 is equipped with cooling jacket 24. Seeded slurry 23 is agitated by agitator 22 for the desired length of time and then harvested through delivery pipe 51 by pump 52 into second crystallization vessel 31 which is equipped with cooling jacket 34. Crystal-containing slurry 33 is agitated by agitator 32 for the desired length of time to produce the amount of yield crystals desired. Alpha orthorhombic crystal slurry of glutamic acid 43 is harvested from second crystallizer 31 through delivery pipe 61 to isolation vessel 31a.

The following examples illustrate methods of carrying out present invention, but it is to be understood that they are given for purposes of illustration and not of limitation:

EXAMPLE 1

A slurry of glutamic acid at 56 grams per liter was pumped at a rate of 25 ml. per minute through a heat exchanger which consisted of stainless steel coils immersed in 100° C. oil bath. The solution from the heat exchanger was pumped into the first crystallizer vessel containing an agitated slurry of alpha orthorhombic crystalline glutamic acid. The original slurry of alpha orthorhombic glutamic acid seed crystal magna was made up of 80 grams of alpha orthorhombic crystalline glutamic acid in 1000 ml. of water. The crystallization vessel was 4 liters in volume and jacketed for cooling. The temperature was maintained at between 5° and 7° C. by the circulation of cold water through jacket. When the volume of the slurry in the first crystallizer vessel reached 3 liters, it was transferred at a rate of 25 ml. per minute to a second crystallizer vessel equipped with a cooling jacket which was maintained at 5° C. The retention aging time in the second crystallizer was 2 hours, and the solids were collected in an isolation vessel, centrifuged, washed, and dried. The yield obtained was 97.7%.

EXAMPLE 2

A slurry of glutamic acid at 82 grams per liter was pumped at a rate of 25 ml. per minute through a heat exchanger which consisted of stainless steel coils immersed in 100° C. oil bath. The solution from the heat exchanger was pumped into the first crystallizer vessel containing an agitated slurry of alpha orthorhombic crystalline glutamic acid. The original slurry of alpha orthorhombic glutamic acid seed crystal magna was made up of 80 grams of alpha orthorhombic crystalline glutamic acid in 1000 ml. of water. The crystallization vessel was 4 liters in volume and jacketed for cooling. The temperature was maintained at between 5° and 7° C. by the circulation of cold water through jacket. When the volume of the slurry in the first crystallizer vessel reached 3 liters, it was transferred at a rate of 25 ml. per minute to a second crystallizer vessel equipped with a cooling jacket which was maintained at 5° C. The retention aging time in the second crystallizer was 2 hours, and the solids were collected in an isolation vessel, centrifuged, washed, and dried. The yield obtained was 95.8%.

EXAMPLE 3

A slurry of glutamic acid at 82 grams per liter was pumped at the rate of 25 ml. per minute through a heat exchanger which consisted of stainless steel coils immersed in 100° oil bath. The solution from the heat exchanger was pumped into the first crystallizer vessel containing an agitated slurry of alpha orthorhombic crystalline glutamic acid. The original slurry of alpha orthorhombic glutamic acid seed crystal magna was made up of 80 grams of alpha orthorhombic crystalline glutamic acid in 1000 ml. of water. The crystallization vessel was 4 liters in volume and jacketed for cooling. The temperature was maintained at between 5° and 7° C. by the circulation of cold water through the jacket. When the volume of the slurry in the first crystallizer vessel reached 2 liters, it was transferred at a rate of 25 ml. per minute to a second crystallizer vessel equipped with a cooling jacket which was maintained at 5° C. The retention aging time in second crystallizer was 80 minutes, and the solids were collected in an isolation vessel, centrifuged, washed, and dried. The yield obtained was 92.0%.

EXAMPLE 4

A slurry of glutamic acid at 75 grams per liter was pumped at the rate of 25 ml. per minute through a heat exchanger which consisted of stainless steel coils immersed in 100° oil bath. The solution from the heat exchanger was pumped into the first crystallizer vessel containing an agitated slurry of alpha orthorhombic crystalline glutamic acid. The original slurry of alpha orthorhombic glutamic acid seed crystal magna was made up of 80 grams of alpha orthorhombic crystalline glutamic acid in 1000 ml. of water. The crystallization vessel was 4 liters in volume and jacketed for cooling. The temperature was maintained at about 20° C. by the circulation of cold water through the jacket. When the volume of the slurry in the first crystallizer vessel reached 3 liters, it was transferred at a rate of 25 ml. per minute to a second crystallizer vessel equipped with a cooling jacket which was maintained at 5° C. The retention aging time in the second crystallizer was 2 hours, and the solids were collected in an isolation vessel, centrifuged, washed, and dried. The yield obtained was 93.0%.

EXAMPLE 5

A slurry of glutamic acid at 75 grams per liter was pumped at the rate of 25 ml. per minute through a heat exchanger which consisted of stainless steel coils immersed in 100° oil bath. The solution from the heat exchanger was pumped into the first crystallizer vessel containing an agitated slurry of alpha orthorhombic crystalline glutamic acid. The original slurry of alpha orthorhombic glutamic acid seed crystal magna was made up of 80 grams of alpha orthorhombic crystalline glutamic acid in 1000 ml. of water. The crystallization vessel was 4 liters in volume and jacketed for cooling. The temperature was maintained at about 20° C. by the circulation of cold water through the jacket. When the volume of the slurry in the first crystallizer vessel reached 1 liter, it was transferred at a rate of 25 ml. per minute to a second crystallizer vessel equipped with a cooling jacket which was maintained at 5° C. The retention aging time in the second crystallizer was 40 minutes, and the solids were collected in an isolation vessel, centrifuged, washed, and dried.

In the foregoing it will be seen that there is herein provided an improved method for the production of the alpha orthorhombic crystalline form of glutamic acid by continuous crystallization which accomplishes all of the objects of the present invention and others including many efforts of great practical utility and commercial importance and acceptance.

While specific embodiments of the present invention have been named and described, it will be apparent to those skilled in the art that changes may be named in the detail shown without departing from the spirit of the present invention or the scope intended. Any departure from the above description which conforms to the present invention is intended to be included within the scope of the claims.

We claim:

1. A method for producing glutamic acid in the alpha orthorhombic crystalline form which comprises continuously passing a slurry of glutamic acid through a heat exchanger at a temperature of between 80°–150° C. to effect complete solution of the acid, said slurry being free of auxiliary chemical solubilizing agents selected from the group consisting of acids and alkalis, transferring the solution from the heat exchanger to a crystallizer vessel containing a magna of alpha orthorhombic seed crystals maintained at a temperature of between 0°–25° C., said solution being added at such a rate so as to maintain a constant volume in the seed crystallizer vessel, said solution being agitated in the seed crystallizer vessel to form a crystalline slurry of alpha orthorhombic glutamic acid, and harvesting the crystalline alpha orthorhombic glutamic acid therefrom.

2. The process of claim 1 wherein the crystalline slurry of alpha orthorhombic glutamic acid is transferred to a second crystallizer vessel, said crystallizer vessel being maintained at a temperature between 0°–10° C., and the crystalline alpha orthorhombic glutamic acid is harvested therefrom.

3. The method of claim 1 wherein the seed crystal magna comprises from about 50 to about 150 grams of alpha orthorhombic crystalline glutamic acid per liter of water.

4. The method of claim 1 wherein the feed solution comprises from about 20 to about 100 grams per liter of glutamic acid.

References Cited

UNITED STATES PATENTS

| | | | |
|---|---|---|---|
| 2,683,739 | 7/1954 | Weidman | 260—527 |
| 3,254,118 | 5/1966 | Hara et al. | 260—534 |
| 3,260,744 | 7/1966 | Kenkichi et al. | 260—534 |

FOREIGN PATENTS 696,843   10/1964   Canada.

LORRAINE A. WEINBERGER, *Primary Examiner.*

A. P. HALLUIN, *Assistant Examiner.*